Patented Feb. 3, 1953

2,627,517

UNITED STATES PATENT OFFICE 2,627,517

BASICALLY SUBSTITUTED 10-PHENO-THIAZINECARBOXAMIDES

John W. Cusic, Skokie, Ill., assignor to G. D. Searle & Co., Chicago, Ill., a corporation of Illinois No Drawing. Application September 1, 1950, Serial No. 182,879

8 Claims. (Cl. 260—243)

The present invention relates to a new class of organic heterocyclic compounds and more particularly to the basically substituted 10-phenothiazinecarboxamides of the structural formula

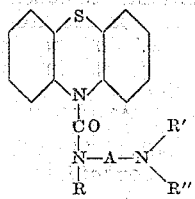

and salts thereof, wherein R is a member of the class consisting of hydrogen, alkyl, cycloalkyl, aryl and aralkyl radicals, A is a bivalent, saturated, aliphatic hydrocarbon radical, NR'R'' is a member of the class consisting of dialkylamino and nitrogen containing heterocylic radicals which are attached to the group A through a nitrogen in the heterocycle.

Among the radicals which R may represent in the foregoing formula are hydrogen, such lower alkyl radicals as methyl, ethyl, propyl, butyl, amyl, and hexyl, wherein the propyl, butyl, amyl and hexyl radicals may be either of the straight-chain or branch-chain type, cycloalkyl radicals as cyclobutyl, cyclopentyl, cyclohexyl and alkyl substitution products thereof as methylcyclohexyl, ethylcyclohexyl and the like, aryl radicals such as phenyl, tolyl, anisyl and naphthyl and aralkyl radicals such as benzyl, phenethyl, phenylpropyl, methoxybenzyl and the like.

The radical A represents a bivalent, saturated, aliphatic hydrocarbon radical, derived from a straight chain or branched chain hydrocarbon and which includes radicals such as ethylene, propylene, butylene, amylene, hexylene and polymethylene radicals such as trimethylene, tetramethylene, pentamethylene and hexamethylene.

In the radical NR'R'', R' and R'' may represent such lower alkyl radicals as defined hereinabove. The radical NR'R'' may also represent a nitrogen containing radical such as piperidine, lupetidine, pyrrolidine, morpholine, thiamorpholine, quinoline, isoquinoline, piperazine, N'-alkylpiperazine and the like.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzene sulfonate, ethyl toluene sulfonate, ethylene chlorohydrin, propylene chlorohydrin, allyl bromide, methallyl bromide and crotyl bromide.

The object of this invention is to provide novel heterocyclic compositions of the type indicated above. These phenothiazinecarboxamide derivatives are valuable intermediates in organic synthesis. They have been found to possess a number of highly useful pharmacodynamic properties, being active as circulatory, diuretic, antihistaminic and spasmolytic agents. Certain of these drugs affect the central nervous system. The quaternary salts act as sympathicolytics and parasympathicolytics and produce ganglion block. Further, these salts are useful as active ingredients in parasiticidal compositions.

In the preparation of the phenothiazinecarboxamides I prefer to heat a 10-phenothiazinecarboxylic acid halide with a substituted alkylenediamine of the type

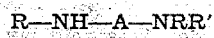

R—NH—A—NRR' all symbols being defined as hereinabove, in an anhydrous organic solvent, preferably one in which both starting materials are soluble, and isolating the resulting hydrohalide by extraction with a mineral acid.

My invention will be described more fully in conjunction with the following examples. It should be understood, however, that these examples are given by way of illustration only and that the invention is not to be construed as limited in spirit or in scope by the details set forth. It will be apparent to those skilled in the art that many modifications in materials and methods may be made without departing from the invention. In each of these examples temperatures are given uncorrected in degrees centigrade.

EXAMPLE 1

*N-(β-dimethylaminoethyl) - 10 - phenothiazinecarboxamide*

522 parts of 10-chloroformyl phenothiazine are mixed with 352 parts of N,N-dimethylethylenediamine in 2400 parts of butanone. The mixture is heated for 12 hours after which the solvents are evaporated on the steam bath. Dilute hydrochloric acid and toluene are added to the residue, whereupon the N-(β-dimethylaminoethyl) - 10 - phenothiazinecarboxamide hydrochloride separates out. After cooling the product is collected on the filter and recrystallized from dilute isopropanol. After alkalinization by ether the base is extracted. The base is then dissolved in a mixture of ether and benzene and treated with a 25% hydrogen chloride solution in isopropanol. Upon recrystallization from dilute isopropanol the hydrochloride melts at about 198–200° C.

EXAMPLE 2

β-(10-phenothiazinecarboxyethyl) trimethylammonium iodide 100 parts of N-(β-dimethylaminoethyl)-10-phenothiazinecarboxamide are mixed with 228 parts of methyl iodide in 3200 parts of butanone with cooling. The β-(10-phenothiazinecarboxyethyl) trimethylammonium iodide precipitates almost at once. After a few minutes of standing it is collected on a filter. This iodide melts at about 223–224° C. The acid tartrate is formed by treatment of this iodide with ½ mole of anhydrous tartaric acid and 1 mole of silver tartrate in absolute isopropanol with stirring in the cold. The silver iodide is filtered off and the solvent removed from the filtrate by evaporation. The cation has the structural formula

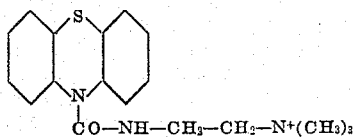

EXAMPLE 3

N-diethylaminoethyl-10-phenothiazinecarboxamide

A mixture of 182 parts of 10-chloroformylphenothiazine and 80 parts of N,N-diethylethylenediamine in 2650 parts of benzene is heated at refluxing temperature for 12 hours. A solid precipitate forms. Dilute hydrochloric acid and ether are added and the hydrochloric acid layer is rendered alkaline by the addition of dilute sodium hydroxide. The acid layer is extracted with anhydrous ether and the ether extract is dried over anhydrous potassium carbonate, filtered and evaporated. The N-di-ethylaminoethyl-10-phenothiazinecarboxamide solidifies upon standing. It may be recrystallized from petroleum ether. The citrate is prepared by treatment of 80 parts of the base with 50 parts of anhydrous citric acid in isopropanol. This citrate melts at about 165–166° C.

EXAMPLE 4

N-(γ-dimethylaminopropyl)-10-phenothiazinecarboxamide

A mixture of 261 parts of 10-chloroformylphenothiazine and 102 parts of N,N-dimethyltrimethylenediamine in benzene is heated at refluxing temperature for 12 hours. A solid precipitate forms. The charge is extracted with dilute hydrochloric acid. The extract yields a white solid precipitate. The extract is rendered alkaline with dilute sodium hydroxide solution and the base extracted with ether. The ether solution is dried over anhydrous potassium carbonate, filtered and evaporated. A benzene-ether solution of the residue is treated with a 25% solution of hydrogen chloride in isopropanol. The N-(γ-dimethylaminopropyl)-10-phenothiazinecarboxamide hydrochloride melts at about 193–194° C. with decomposition.

EXAMPLE 5

N-(γ-diethylaminopropyl)-10-phenothiazinecarboxamide

A mixture of 261 parts of 10-chloroformylphenothiazine and 130 parts of N,N-diethyltrimethylenediamine is heated at refluxing temperature for 6 hours. An oily precipitate separates. Dilute hydrochloric acid is added to the charge and the acid layer is rendered alkaline and extracted with ether. The ether extract is dried over anhydrous potassium carbonate, filtered and evaporated. The N-(γ-diethylaminopropyl)-10-phenothiazinecarboxamide solidifies. The crystals melt at about 82–83° C.

EXAMPLE 6

N-dimethylaminoethyl-10-phenothiazinecarboxanilide

A mixture of 261 parts of 10-chloroformylphenothiazine and 164 parts of N-dimethylaminoethylaniline in 1600 parts of butanone is heated at refluxing temperature for 12 hours. After cooling the solid precipitate is collected on the filter and recrystallized from dilute isopropanol. The N-dimethylaminoethyl-10-phenothiazinecarboxanilide hydrochloride melts at about 223–224° C.

EXAMPLE 7

N-diethylaminoethyl-10-phenothiazinecarboxanilide

A mixture of 261 parts of 10-chloroformylphenothiazine and 192 parts of N-diethylaminoethylaniline in 2400 parts of butanone is heated at refluxing temperature for 12 hours. The mixture is concentrated to about ⅓ of the original volume, crystallization is induced in a sample by treatment with ether. Upon seeding of the cooled main solution the N-diethylaminoethyl-10-phenothiazinecarboxanilide hydrochloride precipitates at once. It melts at about 179–180° C.

EXAMPLE 8

N-(β-diethylaminoethyl)-3'-chloro-10-phenothiazinecarboxanilide

A mixture of 261 parts of 10-chloroformylphenothiazine and 226 parts of N-diethylaminoethyl-3-chloroaniline in 2400 parts of butanone is heated at refluxing temperature for 12 hours. Upon cooling the hydrochloride of N-(β-diethylaminoethyl)-3'-chloro-10-phenothiazinecarboxanilide separates as a heavy, creamy precipitate. This compound has the following structural formula.

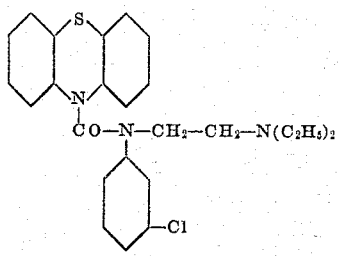

EXAMPLE 9

N-(β-diethylaminoethyl)-2',5'-dichloro-10-phenothiazinecarboxanilide

A mixture of 130 parts of 10-chloroformylphenothiazine and 130 parts of N-diethylaminoethyl-2,5-dichloroaniline in 1600 parts of butanone is heated at refluxing temperature for 10 hours. A solid precipitate forms upon chilling.

The N-(β-diethylaminoethyl)-2',5'-dichloro-10-phenothiazinecarboxanilide hydrochloride is recrystallized from butanone. It has the structural formula

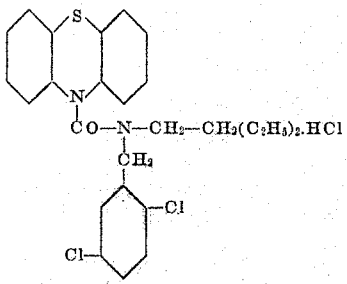

EXAMPLE 10

*N-diethylaminoethyl-1',2',3',4',5',6'-hexahydro-10-phenothiazinecarboxanilide*

A mixture of 261 parts of 10-chloroformylphenothiazine and 198 parts of N-diethylaminoethyl hexahydroaniline in 2400 parts of butanone is heated at refluxing temperature for 12 hours. The solvent is evaporated and water and toluene are added. Upon warming the oily product dissolves. The aqueous layer is separated and rendered alkaline. The N-diethylaminoethyl-1',2',3',4',5',6' - hexahydro - 10 - phenothiazinecarboxanilide is extracted with ether, the ether is dried over anhydrous potassium carbonate, filtered and distilled. Treatment of the ether solution of the base with a 25% solution of hydrogen chloride in anhydrous isopropanol yields an oily precipitate which solidifies upon standing under ether and butanone. The structural formula of this compound is:

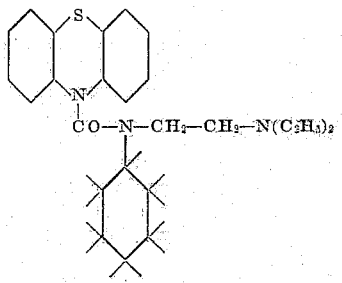

EXAMPLE 11

*N-diethylaminoethyl-1',2',3',4',5',6'-hexahydro-10-phenothiazinecarboxanilide methiodide*

80 parts of N-diethylaminoethyl-1',2',3',4',5',6'-hexahydro-10-phenothiazinecarboxanilide are reacted with 185 parts of methyl iodide in 400 parts of butanone at 0° C. for several hours in a shielded pressure reactor. Upon addition of ether an oily precipitate forms which solidifies on standing. The N-diethylaminoethyl-1',2',3',4',5',6'-hexahydro-10-phenothiazinecarboxanilide methiodide can be recrystallized from isopropanol.

EXAMPLE 12

*N-(γ-diethylaminopropyl)-N-ethyl-10-phenothiazinecarboxamide*

A mixture of 260 parts of N,N-diethyltrimethylenediamine and 156 parts of ethyl iodide in 880 parts of benzene is heated at refluxing temperature for 4 days. After the initial strongly exothermic reaction is completed, the charge is extracted with dilute hydrochloric acid and the extract rendered alkaline by addition of solid sodium hydroxide. The base is extracted with ether, dried and distilled. 158 parts of the fraction boiling at 180–185° C., containing the N,N,N'-triethyl-trimethylenediamine are mixed with 261 parts of 10-chloroformylphenothiazine in 2650 parts of benzene. A heavy precipitate forms. After heating at refluxing temperature for 12 hours, the charge is extracted with dilute hydrochloric acid. The acid layer is separated, rendered alkaline and extracted with a mixture of ether and benzene. The extract is dried over anhydrous potassium carbonate, filtered and evaporated. The residue of N-(γ-diethylaminopropyl)-N-ethyl - 10 - phenothiazinecarboxamide forms an oil which can be crystallized from petroleum ether.

EXAMPLE 13

*N-diethylaminoethyl-N-benzyl-10 - phenoethiazinecarboxamide*

130 parts of 10-chloroformylphenothiazine are mixed with 103 parts of N-diethylaminoethylbenzylamine in 1200 parts of butanone and heated at refluxing temperature for 12 hours. The solvent is evaporated and the residue is extracted with dilute hydrochloric acid, the acid extract is rendered alkaline by addition of dilute sodium hydroxide and extracted with ether. The ether extract is dried over anhydrous potassium carbonate, filtered and evaporated. An ether solution of N-diethylaminoethyl-N-benzyl-10-phenothiazinecarboxamide is treated with a 25% solution of hydrogen chloride in isopropanol. After evaporation of the solvent from the mixture the hydrochloride solidifies on standing. It is recrystallized from hot ethyl acetate and a small quantity of isopropanol. The hydrochloride thus obtained melts at about 142–143° C.

EXAMPLE 14

*N-diethylaminoethyl-N - benzyl - 10 - phenothiazinecarboxamide ethiodide*

A mixture of 70 parts of N-diethylaminoethyl-N-benzyl-10-phenothiazinecarboxamide and 107 parts of ethyl iodide in 3200 parts of butanone is heated in a shielded pressure reactor for 48 hours at 85° C. Upon chilling and treatment with ether, the N-diethylaminoethyl-N-benzyl-10-phenothiazinecarboxamide ethiodide precipitates.

EXAMPLE 15

*N-benzyl-10-phenothiazinecarboxanilide*

A mixture of 261 parts of 10-chloroformylphenothiazine and 183 parts of N-benzylaniline in 100 parts of piperidine and 2650 parts of benzene is heated at refluxing temperature for 12 hours and filtered hot from the precipitate. The solvents are evaporated from the filtrate and the residue is treated with hot toluene and dilute hydrochloric acid. The toluene layer is evaporated and the residue, which solidifies at once, is recrystallized from ethanol. The N-benzyl-10-phenothiazinecarboxanilide thus obtained melts at about 112–113° C.

EXAMPLE 16

*N-(β-piperidinoethyl)-10-phenothiazinecarboxamide*

A mixture of 261 parts of 10-chloroformylphenothiazine and 128 parts of N-(β-aminoethyl)piperidine in 2400 parts of butanone is heated at refluxing temperature for 12 hours. After cooling, the charge is filtered and the solid residue is recrystallized from isopropanol with the aid of decolorizing charcoal. The hydrochloride of N-(β-piperidinoethyl)-10-phenothiazinecarboxamide thus obtained is dissolved in water and the solution is rendered alkaline to precipitate the base. The latter may be purified by recrystallization from petroleum ether with the aid of charcoal.

EXAMPLE 17

N-(β-morpholinoethyl)-10-phenothiazine-carboxamide

A mixture of 130 parts of chloroformylphenothiazine and 70 parts of N-(β-aminoethyl)-morpholine in 1600 parts of butanone is heated at refluxing temperature for 4 hours. After standing at 0° C., the N-(β-morpholinoethyl)-10-phenothiazinecarboxamide hydrochloride precipitates. Upon recrystallization from dilute isopropanol, it melts at about 214–215° C.

I claim:

1. The N-dialkylaminoalkyl-10-phenothiazine-carboxamides of the structural formula

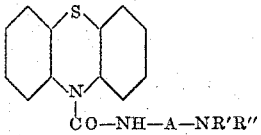

and salts thereof, wherein A is a lower bivalent, saturated, aliphatic hydrocarbon radical containing at least two carbon atoms and R' and R" represent lower alkyl radicals.

2. The N-heterocyclylalkyl-10-phenothiazine-carboxamides of the structural formula

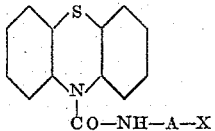

and salts thereof, wherein A is a lower bivalent, saturated, aliphatic hydrocarbon radical containing at least two carbon atoms and X represents a piperidino radical which is connected to the radical A through the nitrogen in the heterocycle.

3. The N-dialkylaminoalkyl-N-isocarbocyclyl-10-phenothiazinecarboxamides of the structural formula

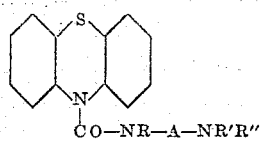

wherein A is a lower bivalent, saturated, aliphatic hydrocarbon radical containing at least two carbon atoms, R is a six-membered monocyclic isocarbocyclyl radical and R' and R" are lower alkyl radicals.

4. The N-dialkylaminoalkyl-10-phenothiazine-carboxanilides of the structural formula

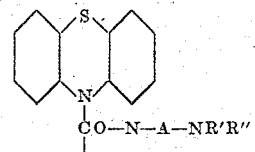

wherein A is a lower bivalent, saturated, aliphatic hydrocarbon radical containing at least two carbon atoms, and R' and R" are lower alkyl radicals.

5. The N-alkyl-N-dialkylaminoalkyl-10-phenothiazineboxanilides of the structural formula

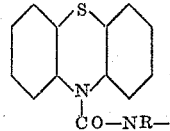

wherein A is a lower bivalent, saturated, aliphatic hydrocarbon radical containing at least two carbon atoms and R, R' and R" are lower alkyl radicals.

6. The N-dialkylaminoalkyl-N-aralkyl-10-phenothiazinecarboxamides of the structural formula

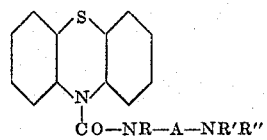

wherein A is a lower bivalent, saturated, aliphatic hydrocarbon radical containing at least two carbon atoms, R is a lower phenylalkyl radical and R' and R" are lower alkyl radicals.

7. The new class of basically substituted phenothiazinecarboxamides of the structural formula

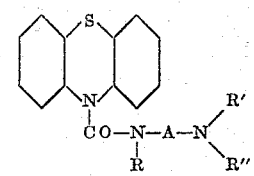

and salts thereof, wherein A represents a lower, bivalent, saturated, aliphatic hydrocarbon radical containing at least two carbon atoms, R represents a member of the class consisting of hydrogen, lower alkyl, lower cycloalkyl, phenyl, chlorinated phenyl, and lower phenylalkyl radicals, and NR'R" represents a member of the class consisting of lower dialkylamino radicals, morpholino radicals, pyrrolidino radicals, and piperidino radicals.

8. The N-diethylaminoalkyl-10-phenothiazine-carboxamides of the structural formula

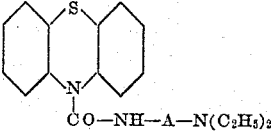

wherein A is a lower, bivalent, saturated, aliphatic, hydrocarbon radical containing at least two carbon atoms.

JOHN W. CUSIC.

REFERENCES CITED

The following references are of record in the file of this patent:

UNITED STATES PATENTS

| Number | Name | Date |
|---|---|---|
| 2,461,460 | Winnek et al. | Feb. 8, 1949 |
| 2,483,999 | Hunter et al. | Oct. 4, 1949 |